United States Patent
Park et al.

(10) Patent No.: US 9,219,763 B2
(45) Date of Patent: Dec. 22, 2015

(54) NETWORK SYSTEM

(75) Inventors: Hyoungjun Park, Changwon-si (KR);
Yanghwan Kim, Changwon-si (KR);
Hoonbong Lee, Changwon-si (KR);
Museung Kim, Changwon-si (KR);
Jongmi Choi, Changwon-si (KR);
Chansung Jeon, Changwon-si (KR);
Seonghwan Kang, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 268 days.

(21) Appl. No.: 13/978,472

(22) PCT Filed: Jan. 5, 2012

(86) PCT No.: PCT/KR2012/000129
§ 371 (c)(1),
(2), (4) Date: Aug. 12, 2013

(87) PCT Pub. No.: WO2012/093874
PCT Pub. Date: Jul. 12, 2012

(65) Prior Publication Data
US 2014/0372619 A1    Dec. 18, 2014

(30) Foreign Application Priority Data

Jan. 6, 2011 (KR) .................. 10-2011-0001544
Jan. 6, 2011 (KR) .................. 10-2011-0001545

(51) Int. Cl.
*H04L 29/06* (2006.01)
*G08C 17/02* (2006.01)
*H04L 29/12* (2006.01)

(52) U.S. Cl.
CPC .......... *H04L 65/1069* (2013.01); *G08C 17/02* (2013.01); *H04L 61/2038* (2013.01); *G08C 2201/40* (2013.01)

(58) Field of Classification Search
CPC ............... G08C 17/02; G08C 2201/40; H04L 61/2038; H04L 65/1069
See application file for complete search history.

(56) References Cited

U.S. PATENT DOCUMENTS

| 6,407,779 | B1* | 6/2002 | Herz .............................. 348/734 |
| 6,571,111 | B1* | 5/2003 | Mayo et al. .................. 455/574 |
| 2006/0046719 | A1* | 3/2006 | Holtschneider ............... 455/434 |
| 2008/0114828 | A1* | 5/2008 | Yoshida ........................ 709/201 |

(Continued)

FOREIGN PATENT DOCUMENTS

| KR | 10-2002-0091312 A | 12/2002 |
| KR | 10-2005-0078302 A | 8/2005 |
| KR | 10-2006-0045122 A | 5/2006 |

*Primary Examiner* — Brian J Gillis
*Assistant Examiner* — Gil H. Lee
(74) *Attorney, Agent, or Firm* — Dentons US LLP

(57) ABSTRACT

A network system is provided. The network system includes: a first component having a first device code and performing a predetermined function; and a second component having a second device code and exchanging information with the first component for communication connection. One of the first and second components receives a command for the communication connection and generates a connection sequence. The component generating the connection sequence exchanges communication addresses and device codes with the other component receiving the connection sequence. If the information has not been exchanged between the first component and the second component during a predetermined time, the first component and the second component are switched to a communication connection standby mode.

13 Claims, 14 Drawing Sheets

(56) References Cited

U.S. PATENT DOCUMENTS

| | | |
|---|---|---|
| 2008/0235406 A1* | 9/2008 | Meijer et al. .................... 710/16 |
| 2009/0150698 A1* | 6/2009 | Lee ............................... 713/323 |
| 2009/0322314 A1* | 12/2009 | Long et al. .................... 324/142 |
| 2010/0070783 A1* | 3/2010 | Okamoto et al. ............. 713/310 |
| 2010/0268973 A1* | 10/2010 | Park .............................. 713/323 |
| 2011/0015796 A1* | 1/2011 | Heydron et al. .............. 700/286 |
| 2011/0055434 A1* | 3/2011 | Pyers et al. ..................... 710/14 |
| 2011/0276708 A1* | 11/2011 | Rogan et al. .................. 709/230 |

* cited by examiner

NETWORK SYSTEM

The present application is a national stage entry of International Application No. PCT/KR2012/000129, filed on Jan. 5, 2012, which claims priority to Korean Patent Application Nos. 10-2011-0001544 filed on Jan. 6, 2011 and No. 10-2011-0001545 filed On Jan. 6, 2011, all of which are hereby incorporated by reference in its their entirety.

CROSS-REFERENCE TO RELATED APPLICATIONS

The present application claims priority under 35 U.S.C. 119 and 35 U.S.C. 365 to Korean Patent Application No. 10-2011-0001544 filed on Jan. 6, 2011 and No. 10-2011-0001545 filed on Jan. 6, 2011, which is hereby incorporated by reference in its entirety.

BACKGROUND

The present disclosure relates to a network system.

In general, electric home appliances include washers, refrigerators, cooking utensils, and vacuums. In the related art, a user must approach an electric appliance to control the operation of the electric appliance.

Recently, as communication technology is highly developed, however, controlling electric appliances remotely (that is, inside or outside home) is being increasingly required by users.

SUMMARY

Embodiments provide a network system which may connect communication between an electric appliance and a specific control device to control the electric appliance remotely.

Embodiments also provide a network system which may implement an internal communication interface of an electric appliance for external communication.

In one embodiment, a network system includes: a first component having a first device code and performing a predetermined function; and a second component having a second device code and exchanging information with the first component for communication connection, wherein one of the first and second components receives a command for the communication connection and generates a connection sequence, the component generating the connection sequence exchanges communication addresses and device codes with another component receiving the connection sequence, and if the information has not been exchanged between the first component and the second component during a predetermined time, the first component and the second component are switched to a communication connection standby mode.

In another embodiment, a network system includes: an electric appliance having a first device code and performing a predetermined function; and an external component having a second device code and exchanging information with the electric appliance for communication connection, wherein the electric appliance or external component receives a command for the communication connection and generates a connection sequence, and the component generating the connection sequence exchanges communication addresses and device codes with the other component receiving the connection sequence, wherein the electric appliance includes a master component generating a communication state confirmation signal for confirming whether an interface of the electric appliance is in a communication enabled state; and a slave component at least transmitting a reception confirmation signal corresponding to the communication state confirmation signal of the master component.

The details of one or more embodiments are set forth in the accompanying drawings and the description below. Other features will be apparent from the description and drawings, and from the claims.

DETAILED DESCRIPTION OF THE EMBODIMENTS

Hereinafter, exemplary embodiments will be described with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

Figure 1:
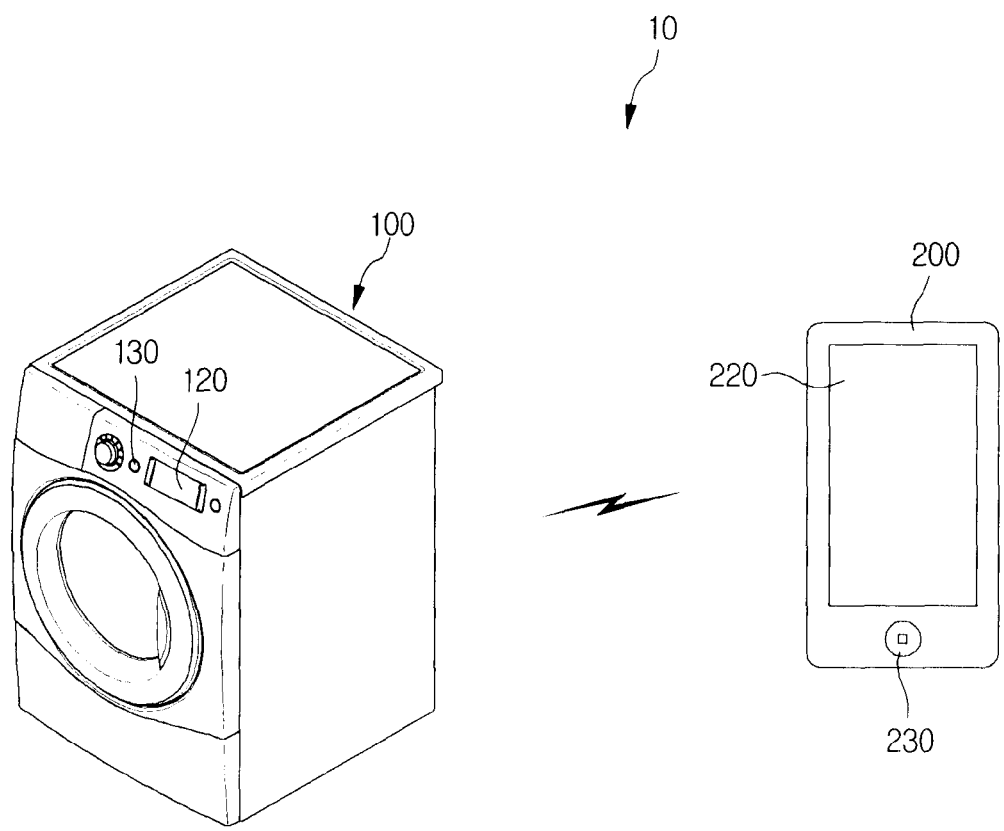
FIG. 1 is a view illustrating a network system according to a first embodiment.
Figure 2:
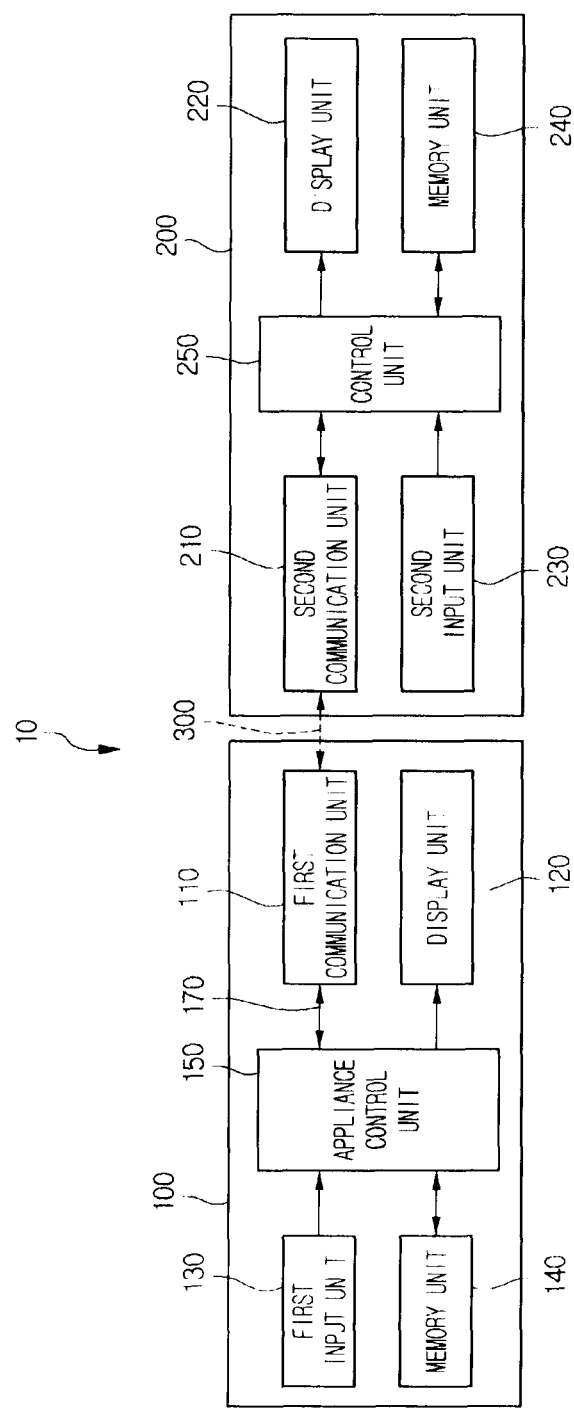
FIG. 2 is a block diagram illustrating the network system according to the first embodiment.

FIG. 1 is a view illustrating a network system according to a first embodiment, and FIG. 2 is a block diagram illustrating the network system according to the first embodiment.

Referring to FIGS. 1 and 2, a network system 10 according to the first embodiment includes: an electric appliance 100 as one component constituting the network system 10 and performing a predetermined function; and a control device 200 as another component constituting the network system 10 performing a predetermined function. The control device can control the electric appliance 100.

The control device 200 includes a remote controller for controlling the electric appliance 100 at a position away from the electric appliance 100. In the drawing, a washer is shown as an example of the electric appliance 100. However, the electric appliance 100 is not limited thereto. For example, the electric appliance 100 may include a refrigerator, a cooking utensil, a dryer, an air conditioner, a vacuum, or a water purifier.

The electric appliance 100 includes a first communication unit 110 connecting communication between the electric appliance 100 and the control unit 200; a display unit 120 displaying an operation state of the electric appliance 100; a first input unit 130 through which a certain command is input for operating the electric appliance 100; a memory unit 140 storing information about operations of the electric appliance 100; and an appliance control unit 150 controlling the above elements.

The first communication unit 110 may be considered as a gateway connected with the control device 200. The first communication unit 110 may receive external information according to a control command of the appliance control unit 150 and deliver the external information to the appliance control unit 150. Alternatively, the first communication unit 110 may transmit internal information about the electric appliance 100 to the outside (for example, the control device 200). A second interface 170 for information (data) communication between the first communication unit 110 and the appliance control unit 150 may be defined.

The control device 200 includes a second communication unit 210 connected to the first communication unit 110; a display unit 220 displaying a user interface of the control device 200; a second input unit 230 though which a certain command is input to the control device 200; a memory unit 240 storing information about operations of the electric appliance 100 or the control device 200, and a control unit 250 controlling the above elements.

The second communication unit 210 may receive operation information of the electric appliance 100 from the first communication unit 110 and transmit information regarding control command of the control device 200 to the first communication unit 110. A first interface 300 for communication between the first communication unit 110 and the second communication unit 210 may be defined.

The display unit 220 may display information regarding an operation of the control device 200 or the electric appliance 100. The second input unit 230 may receive a certain command for controlling an operation of the electric appliance 100. The memory unit 240 may store a plurality of pieces of information for performing a function of the control device 200. The plurality of pieces of information may include a first piece of information for performing a function of the control device 200 itself or a second piece of information for performing or operating a function of the electric appliance 100.

Figure 3:
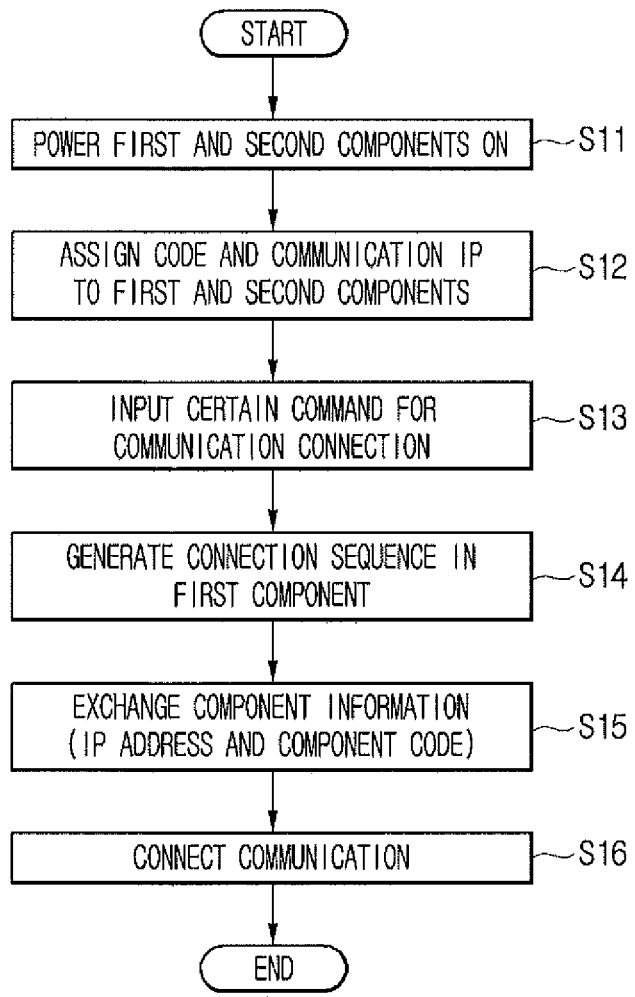
FIG. 3 is a flowchart illustrating a process of connecting communication between a plurality of components according to the first embodiment.

FIG. 3 is a flowchart illustrating a process of connecting connection between a plurality of components according to the first embodiment.

FIG. 3 illustrates a process of connecting communication between a plurality of components constituting the network system 10 according to the first embodiment. For example, information communication may be started between a first component and a second component. Herein, the first component may be a control device, and the second component may be a control object which may be controlled by the control device, for example, an electric appliance.

When the first component is powered on, the first component may recognize a device code (first code) of the first component, and an IP (communication address) of the second communication unit 210 may be assigned to the first component. The device code may be a unique identification number (character) given when the first component is fabricated, installed, or sold. When the first component is powered on, information related to the device code may be delivered to the second communication unit 210.

The IP may be a static or dynamic IP for communicating with the second component. According to a communication method, the IP may be assigned through a separate access point (AP) or based on internal settings of the first component. For an example, the communication method may include Wi-Fi, BLUETOOTH, or ZIGBEE.

Likewise, when the second component is powered on, the second component may recognize a device code (second code) of the second component, and an IP of the first communication unit 110 may be assigned to the second component (S11, S12).

For communication connection between the first component and the second component, the first component or the second component may receive a predetermined command. For example, if the first component is a control device, the predetermined command may be sent to the first component. It can be understood that the predetermined command is to execute predetermined data for controlling operations of the second component.

The predetermined data may be a specific program (for example, an application program). The specific program may be stored in the memory unit 240 of the first component, that is, the control device 200. Also, the specific program may be downloaded from a web server. For this, the first component is accessible through the Internet (S13).

When receiving the predetermined command, the first component generates a connection sequence for connection with the second component. The second component may receive the connection sequence of the first component (S14).

Also, the first component and the second component may exchange information with each other. The information exchanged between the first component and the second component may include the IP address and code information of each component.

The information may be exchanged through direct recognition or search of an object component (device) by the first or second component or the first and second components may directly exchange information with each other by recognizing or searching for each other or may exchange information with each other via a specific server storing information about the first or second component (S15).

The first component and the second component may communicate with each other after exchanging information with each other. After communication connection is established between the first and second components, the first and second components can communicate information (data) with each other (S16).

Figure 4:
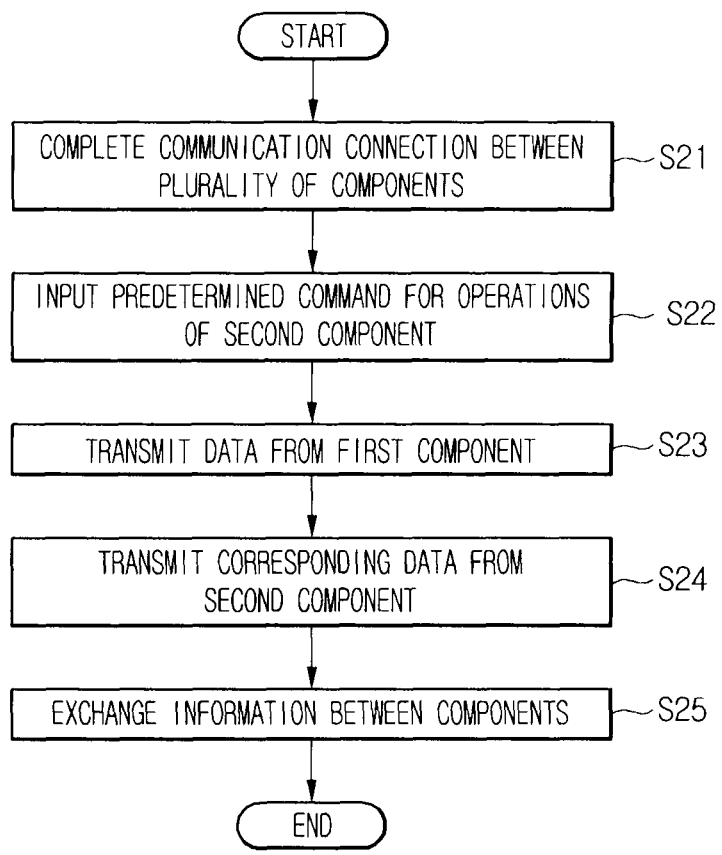
FIG. 4 is a flowchart illustrating a process of communicating signals between the plurality of components according to the first embodiment.

FIG. 4 is a flowchart illustrating a process of communicating signals between the pluralities of components according to the first embodiment.

After communication connections are established among the plurality of components (S21), a predetermined command may be input for operations of the second component. Herein, it can be understood that the second component is considered as a control object which is controlled by the control device. Also, the predetermined command may be input through the first or second component.

The predetermined command, a command for controlling operations of the second component, may be differentiated from a predetermined command input for communication connection as described in FIG. 3. For differentiation, the input command described with reference to FIG. 3 is referred to as a "first command", and the input command described with reference to FIG. 4 is referred to as a "second command".

For example, the second command may be input through a predetermined input unit (as an example, button or touch screen) included in the first component. The first component may be a "control device" for controlling operations of the second component (S22).

When the second command is input, the first component transmits a predetermined data to the second component. The data may be information regarding a specific control command for controlling operations of the second component or data regarding operation information or setting information of the second component (S23).

If the second component receives the data, the second component transmits a signal corresponding to the data. The corresponding signal includes a confirmation signal confirming that the data has been received or a resulting signal related to the data.

The resulting signal can be understood as a data signal corresponding to information requested by the first component. For example, the resulting signal may include current or past operation information (operation time or used power amount), and a state value initially stored in the second component.

That is, when the first component requests state information or operation information on the second component, the second component sends a predetermined data value relating to the request information to the first component by transmitting the resulting signal to the first component (S24).

As a result of data transmission from the first component and correspondence data transmission from the second component, information may be exchanged between the plurality of components. The information exchange may be performed repeatedly (S25).

Figure 5:
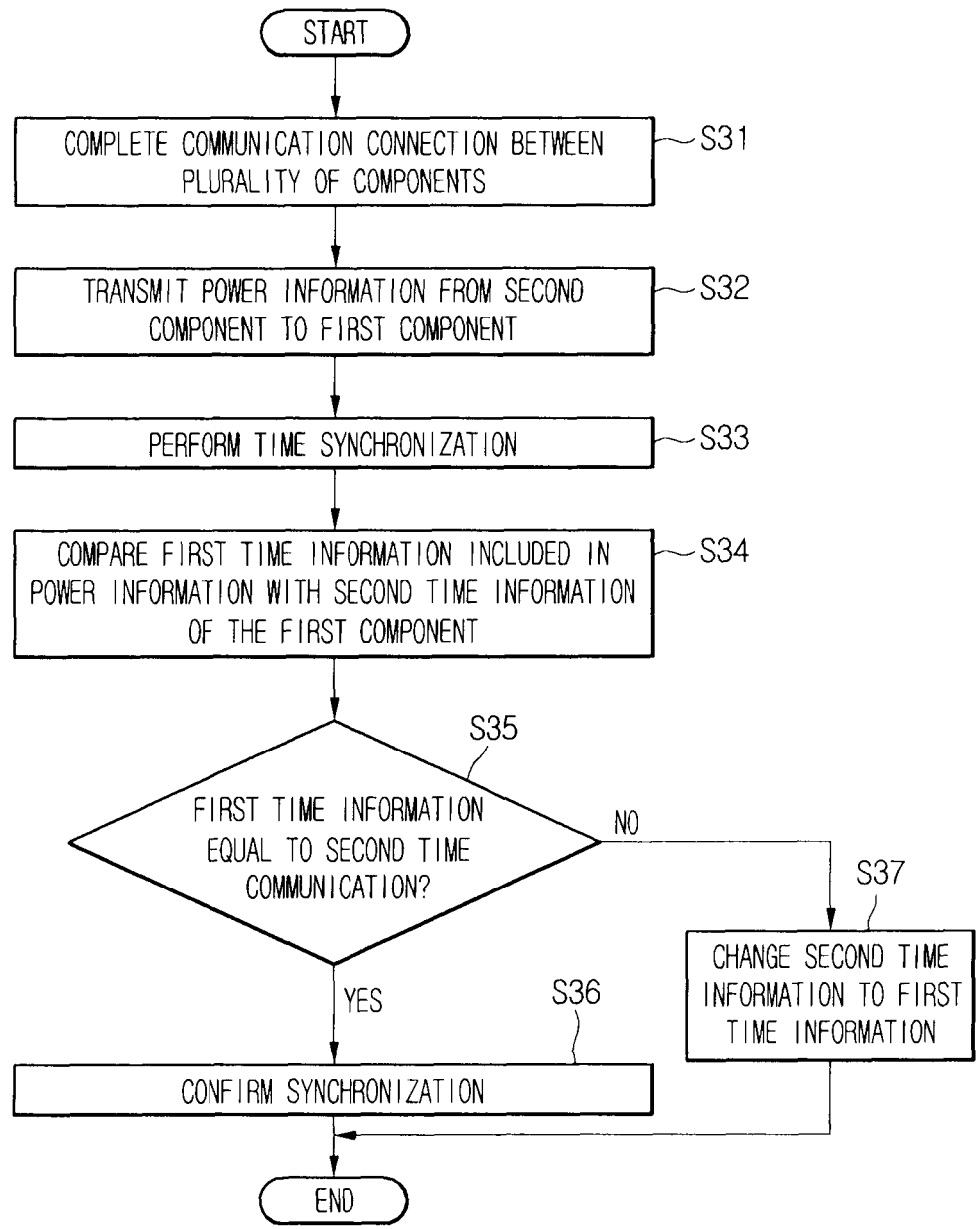
FIG. 5 is a flowchart illustrating a process of communicating power information according to the first embodiment.

FIG. 5 is a flowchart illustrating a process of communicating power information according to the first embodiment. Referring to FIG. 5, a process of communicating an auto signal, for example, power information between a plurality of components will be described.

As illustrated in FIG. 3, when communication connection between the plurality of components (first and second components) is completed (S31), the power information is transmitted from one of the first component and the second component to the other. Herein, the first component may be a control device, and the second component may be a control object, for example, electric appliance.

In the drawing, as an example, the power information is transmitted from the second component to the first component. In contrast, the power information may be transmitted from the first component to the second component.

The power information may be information regarding power (or energy) supplied from a power supplier (for example, electric power company) and may include information regarding a power rate or power supply amount. The information regarding a power rate or power supply amount may vary with time. Also, the power information may be transmitted from the power supplier to the first or second component. The power information may be understood as an "auto signal" which is transmitted from one component of the first and second components that stores the power information to the other after communication connection is established between the first and second components (S32).

Information synchronization between components, for example, time synchronization is performed using the power information. The time synchronization may be performed while a component which had received the auto signal (power information) transmits a corresponding signal.

The power information may include time information. Under an environment where a power rate varies with time, the operation time or operation method of an electric appliance may vary depending on the power rate. For example, as the power rate for an electric appliance is low, the electric appliance may be controlled more. For this, time information included in the power information is required to be applied to the first component or the second component.

If the time information included in the power information is different from time information of the first or second component, the operations of the component may not be controlled as desired. For example, a component constituting an appliance may operate when a power rate is high (S33).

First time information of power information transmitted from the second component may be compared with second time information included in the first component (S34). If the first time information is the same as the second time information, it is determined or confirmed that time synchronization has been made (S35, S36).

In contrast, if the first time information is not the same as the second time information, the second time information of the first component is changed to the first time information (S37). After the synchronization is confirmed or performed, a resulting signal of the first component may be transmitted to the second component.

Like this, time information of the first or second component can be set equal to the time information included in the power information, and thus components can be easily controlled based on the power information.

Figure 6:
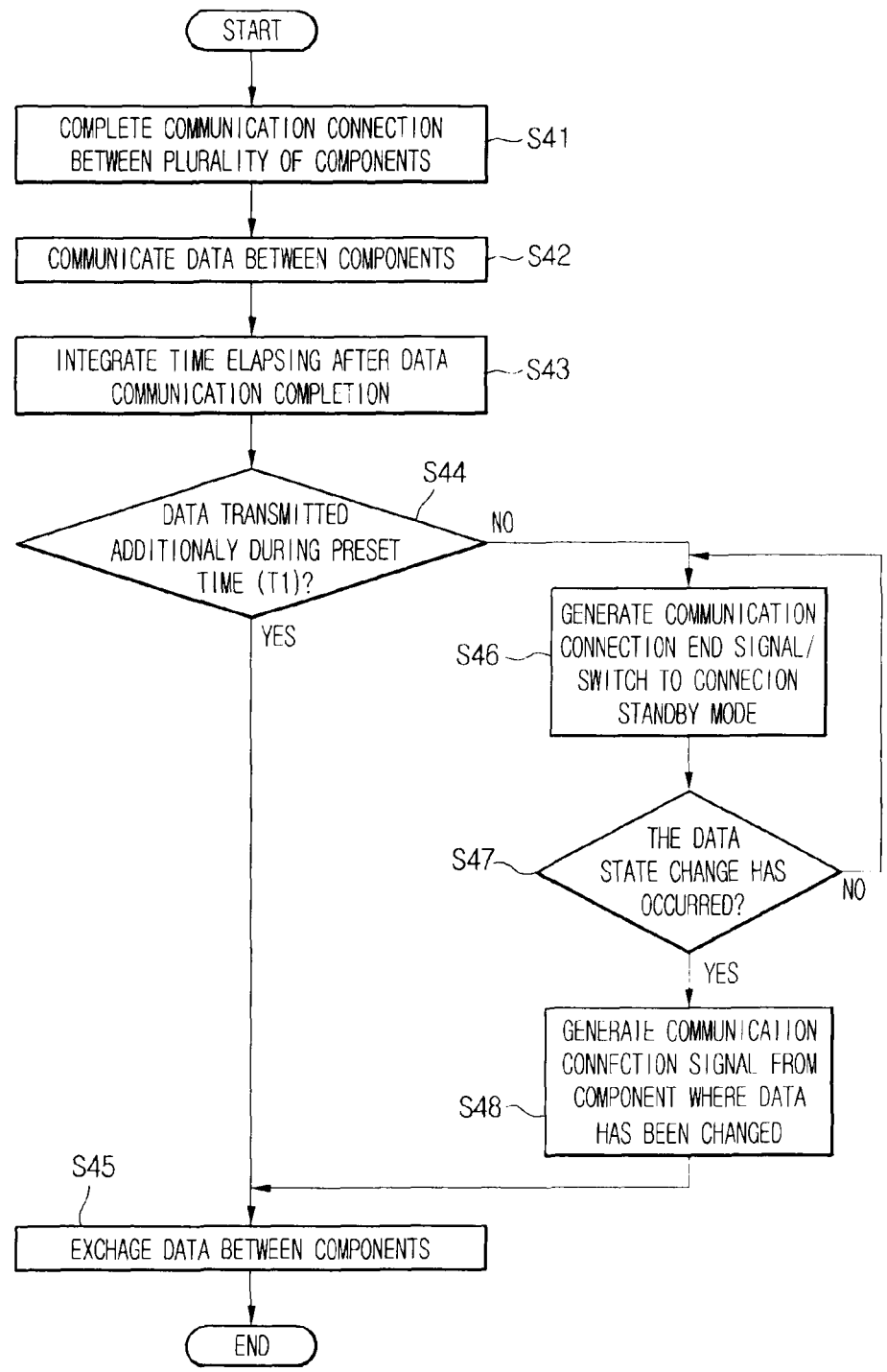
FIG. 6 is a flowchart illustrating a process of switching communication connection to standby mode between the plurality of components according to the first embodiment.

FIG. 6 is a flowchart illustrating a process of switching communication connection to standby mode between the plurality of components according to the first embodiment. With reference to FIG. 6, explanations will be given on a process of transmitting and receiving data in a state where communication connection is established between a plurality of components, and a process of interrupting the communication connection under a predetermined condition.

First, as illustrated in FIG. 3, after communication connection is established between a plurality of components (S41), data can be transmitted and received between the components. A description of a process of transmitting and receiving data is not repeated because it has been given with reference to FIGS. 4 and 5 (S42).

One component transmits information (data) to another component, and the other component transmits a corresponding signal (for example, corresponding signal in FIG. 4 or time synchronization in FIG. 5). When data communication between the plurality of components is completed, time elapsing thereafter may be integrated (S43).

During a preset time (t1), whether data has been additionally transmitted from one of the first and second components to the other is recognized. For example, t1 may be 2 sec (S44). If data has been additionally transmitted, data exchange between the plurality of components described above may be additionally performed (S45).

In contrast, for the preset time, if data has not been additionally transmitted, at least one of the first and second components generates a communication connection end signal. The communication connection end signal may be delivered to another component, and thus a plurality of components may be switched to communication connection standby mode. Herein, the communication connection end signal means "communication pause", and thus can be differentiated from communication end (for example, power off). When a plurality of components are switched to the communication connection standby mode, communication between the plurality of components may be limited. Using this control method, each component can be prevented from being overloaded, and power consumption can be reduced (S46).

After the communication connection is ended, whether a data state change has occurred in the first or second component is recognized. That is, whether new information (data) has been transmitted from at least one of the first and second components is recognized (S47).

If a data state change (or data transmission) has occurred, a component having the changed data or a component transmitting new data generates a communication connection sequence. The generated communication connection sequence is transmitted to another component, and thus communication connection may be made therebetween. Thereafter, data exchange may be made between a plurality of components (S48).

Like this, when a data state change has occurred, communication between the components can be performed if necessary, thereby reducing communication overload and enhancing communication reliability.

Hereinafter, second to sixth embodiments will now be described.

These embodiments are different from the first embodiment with respect to a configuration or action of an electric appliance and a control device. Accordingly, differences will be described principally, and a description of the same parts thereof will be omitted.

Figure 7:
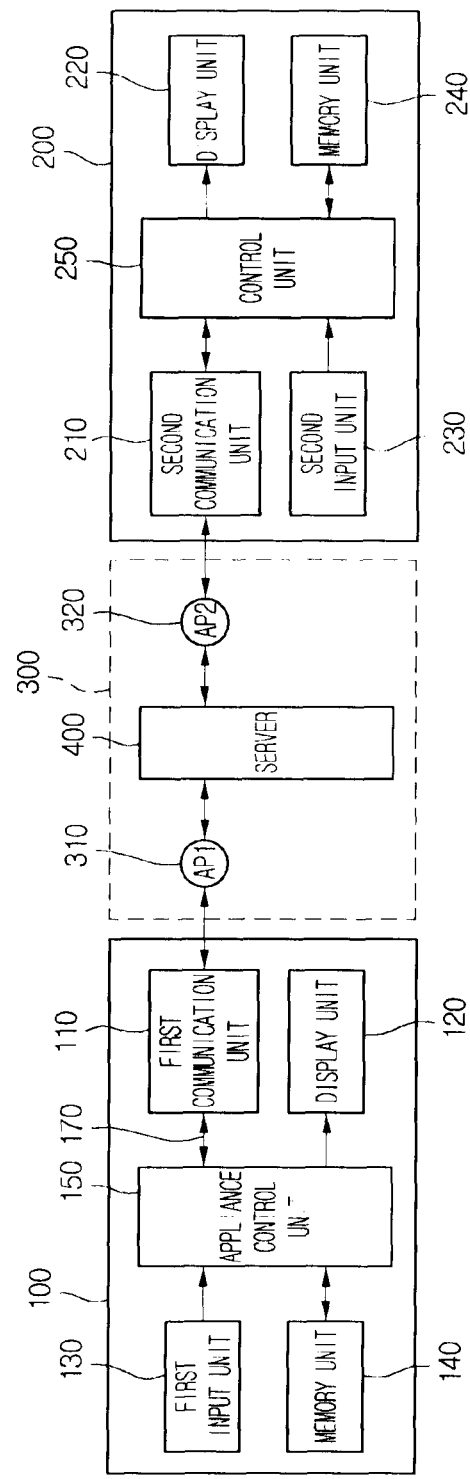
FIG. 7 is a view illustrating a network system according to a second embodiment.

FIG. 7 is a view illustrating a network system according to a second embodiment.

Referring to FIG. 7, a network system 10 according to the second embodiment includes a server 400 positioned between the electric appliance 100 and the control device 200 and storing operation information regarding the electric appliance 100 or control device 200. The server 400, a component configuring the network system 10, can be understood as a component having a relay (management) function of relaying communication between the electric appliance 100 and control device 200.

As an example, in FIG. 3 related to the first embodiment, when a predetermined command for communication is input to a first component or the first component is powered on, the first component may generate a connection sequence, which may be delivered to the server 400. When the predetermined command for communication is input to a second component or the second component is powered on, the second component may deliver a connection sequence to the server 400 automatically.

And, information of the first and second components in FIG. 3 can be understood as being exchanged through the server 400. That is, the information of the first and second components may be transmitted to and stored in the server 400. During the process of performing communication between the first and second components, if information requested by the first or second component is stored in the server 400, the component may receive the information directly from the server 400. If the information is not stored in the server 400, the component may request the other component to transmit the information, and receive the information.

The time synchronization, corresponding signal, or data described in FIGS. 4 and 5 may be delivered to the first or second component through the server 400. As an example, the power information may be delivered from the outside through the server 400 to the first or second component.

As an example, the power information may be delivered from the outside through the server 400 to the first or second component. According to this control method, the communication can be limited if data is not communicated, thereby preventing a server from being overloaded. Like this, a server having a storage device is introduced between the first and second components to communicate between the first and second components, thereby enhancing communication reliability.

The server 400 can be understood as being the first or second component itself. If the second component is an electric appliance, the server 400 as the first component may communicate with the second component. If the second component is an electric appliance, the server 400 as the first component may communicate with the second component.

If the communication method of a first interface 300 between the electric appliance 100 and the control device 200 is "Wi-Fi", routers 310 and 320 is further included. The routers 310 and 320 as Access Points (APs) can be understood as being a wireless router. A first router 310 is for communication setting between the electric appliance 100 and the server 400, and a second router 320 is for communication setting between the first router 310 and the server 400. Herein, the first router 310 and the second router 320 may be the same.

In the process of communicatively connecting the electric appliance 100 and the control device 200 through the routers 310 and 320, the first communication unit 110 and the second communication unit 210 may receive assignment of IPs from the routers 310 and 320. Like this, when Wi-Fi using an AP is applied as a communication method, the distance between the electric appliance 100 and the control device 200 cannot be limited, thereby controlling the control device 200 remotely.

Figure 8:
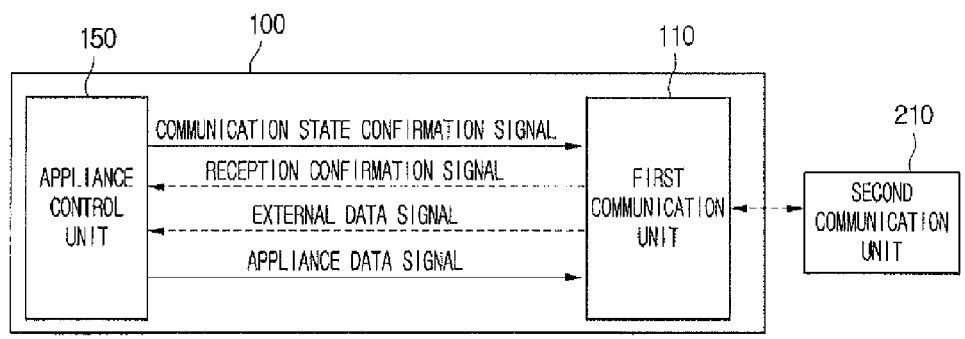
FIG. 8 is a block diagram illustrating a process of communicating signals inside an electric appliance according to a third embodiment.

FIG. 8 is a block diagram illustrating a process of communicating signals inside an electric appliance according to a third embodiment.

Referring to FIG. 8, the electric appliance 700 according to the third embodiment includes the first communication unit 110 communicatively connected to the outside, in particular, the second communication unit 210, and the appliance control unit 150 communicating specific information (data) or a signal with the first communication unit 110. In this embodiment, the appliance control unit 150 can be understood as being a master component and the first communication unit 110 can be understood as being a slave component.

The appliance control unit 150 can confirm whether a second communication interface 170 with the first communication unit 110 is maintained in a communication enabled state. As an example, whether the second communication interface is maintained in the communication enabled state may be recognized on the basis of whether the first communication unit 110 is equipped or is in a communication enabled state.

To confirm whether the second communication interface 170 is in the communication enabled state, the appliance control unit 150 transmits a communication state confirmation signal to the first communication unit 110. The communication state confirmation signal may be a dummy frame signal which does not include useful information (for example, operation information) about the electric appliance 100. The communication state confirmation signal may be transmitted to the first communication unit 110 periodically. For example, the communication state confirmation signal may be transmitted at one second intervals.

Corresponding to the communication state confirmation signal of the appliance control unit 150, the first communication unit 110 may transmit a reception confirmation signal, or an external data signal held or stored by the first communication unit 110 to the appliance control unit 150.

The reception confirmation signal is a signal for confirming that the communication state confirmation signal has been received, and may be delivered to the appliance control unit 150 when there is no data to be delivered to the appliance control unit 150.

The external data signal can be understood as being a data signal to be delivered from a component, other than the electric appliance, configuring the network system 10. Herein, the component may include a control device 200 and a server which is communicatively connected to the electric appliance 100 and the control device 200 and stores information about the electric appliance 100 or control device 200. The external data signal may be a signal for requesting the electric appliance 100 to send specific information.

When the communication state confirmation signal is received from the appliance control unit 150, the first communication unit 110 may transmit the external data signal to the appliance control unit 150.

If the external data signal is delivered from a specific component to the first communication unit 110 after the communication state confirmation signal is received, then the first communication unit 110 may transmit the external data signal to the appliance control unit 150 after receiving the next communication state confirmation signal.

When the appliance control unit 150 receives the external data signal, the appliance control unit 150 transmits an appliance data (internal data) signal corresponding to the external data signal. Herein, the appliance data signal may be a useful data about operation information, a state value, or a function of the electric appliance 100.

Figure 9:
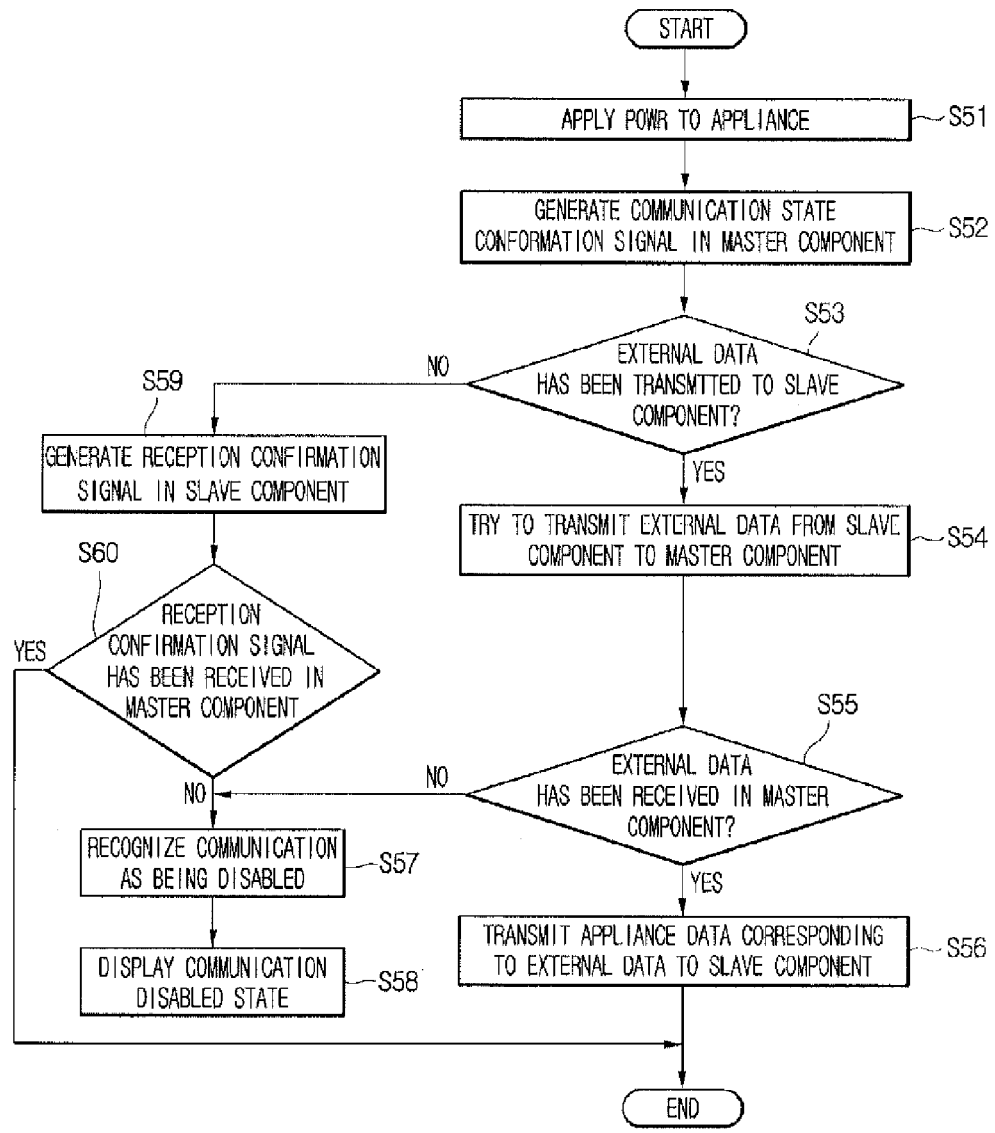
FIG. 9 is a flowchart illustrating a process of communicating signals inside an electric appliance according to the third embodiment.

FIG. 9 is a flowchart illustrating a process of communicating signals inside an electric appliance according to the third embodiment.

Referring to FIG. 9, a control method in the case where according to the third embodiment, the appliance control unit 150 is a master component and the first communication unit 110 is a slave component will be described.

When the electric appliance 100 is powered on (S51), a master component 150 generates a communication state confirmation signal and then delivers the generated communication state confirmation signal to a slave component 110 (S52). Whether the external data has been transmitted to the slave component 110 is recognized (S53), and if the external data has been transmitted, the slave component 110 tries to transmit the external data to the master component 150 (S54).

Whether the master component 150 has received external data is recognized (S55), and if the external data has been received, appliance data responding to the external data is transmitted to the slave component 110 (S56).

However, if the master component 150 has not received the external data, communication may be recognized as being disabled. Whether the master component 150 has received the external data may be determined depending on whether the external data has been received during a predetermined time period after the master component 150 transmitted the communication state confirmation signal.

The process of recognizing communication as being disabled will be described in detail.

As an embodiment, if the master component 150 does not receive the external data, the slave component 110 may repeatedly transmit the external data a predetermined number of times. In the process of transmitting the external data repeatedly, if the master component 150 receives the external data, the communication may be recognized as being enabled.

However, when the master component 150 does not receive the external data even though the external data has been repeatedly transmitted the predetermined number of times, the communication may be recognized as being disabled, and the electric appliance 100 may display a "communication disabled state".

An another embodiment, even though a predetermined time has passed after the external data tries to be transmitted from the slave component 110 to the master component 150, when the master component 150 does not receive the external data, the communication may be recognized as being disabled. And, the electric appliance 100 may display the communication disabled state.

As even another embodiment, if the external data delivered to the master component 150 has the signal strength less than a predetermined strength, the communication may be recognized as being disabled, and the electric appliance 100 may display the communication disabled state (S57 and S58).

In operation S53, when the slave component 110 has not received the external data, the slave component 110 generates the reception confirmation signal (S59).

Whether the master component 150 has received the reception confirmation signal is recognized (S60), and if not received, the communication may be recognized as being disabled. Whether the master component 150 has received the reception confirmation data may be determined depending on whether the reception confirmation data has been received during a predetermined time period after the master component 150 transmitted the communication state confirmation signal. The process of recognizing communication as being disabled will refer to the above description (S57 and S58).

Hereinafter, a second embodiment will now be described. Since the current embodiment is the same as the first embodiment except for configurations of the master component and slave component, differences therebetween will be mainly described and descriptions of the same parts will refer to descriptions and reference numerals of the first embodiment.

Figure 10:
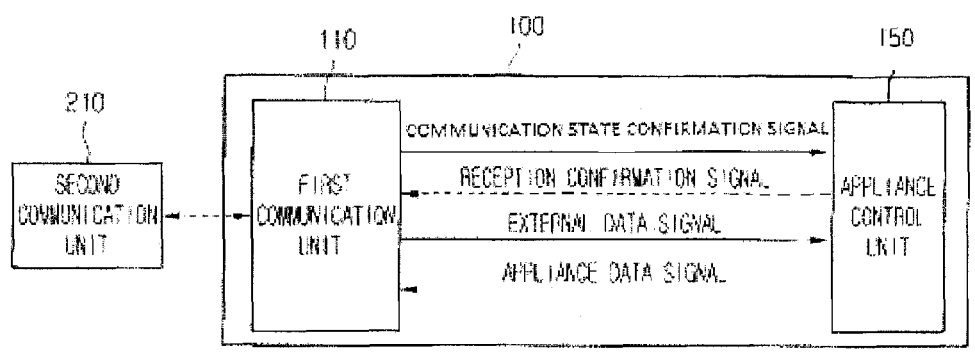
FIG. 10 is a block diagram illustrating a process of communicating signals inside an electric appliance according to a fourth embodiment.

FIG. 10 is a block diagram illustrating a process of communicating signals inside an electric appliance according to a fourth embodiment.

Referring to FIG. 10, the electric appliance 100 according to the fourth embodiment includes the first communication unit 110 communicatively connected to the second communication 210 and the appliance control unit 150 communicating specific information (data) or a signal with the first communication unit 110. In this embodiment, the first communication unit 110 can be understood as being a master component, and the appliance control unit 150 can be understood as being a slave component.

The first communication unit 110 can confirm whether a second communication interface 170 with the first communication unit 110 is maintained in a communication enabled state. To confirm whether the second communication interface 170 is in the communication enabled state, the first communication unit 110 transmits the communication state confirmation signal to the appliance control unit 150.

The communication state confirmation signal may be transmitted to the appliance control unit 150 repeatedly, and may be transmitted as necessary when the first communication unit 110 has external data received from the outside. That is, when the first communication unit 110 has the external data, the external data may be transmitted as the external data to the appliance control unit 150. Corresponding to the communication state confirmation signal of the first communication unit 110, the appliance control unit 150 may transmit a reception confirmation signal or appliance data signal to the first communication unit 110.

If the external data is transmitted from the outside (as an example, specific component) to the first communication unit 110, then the first communication unit 110 may transmit the external data to the appliance control unit 150 directly, or after transmitting the communication confirmation signal and then receiving the reception confirmation signal from the appliance control unit 150. When the appliance control unit 150 receives the external data, the appliance control unit 150 transmits an appliance data signal corresponding to the external data to the first communication unit 110.

Another embodiment will now be described.

In the above embodiment, the appliance control unit 150 was described as transmitting the appliance data signal after receiving the external data. Unlike this, the appliance control unit 150 may transmit the appliance data signal to the first communication unit 110 when receiving the communication state confirmation signal such that the electric appliance 100 transmits data to an external component first. The external component receiving the appliance data signal may transmit the external data signal corresponding to the appliance data signal. Herein, the external component can be understood as a component other than the appliance control unit 150 and the first communication unit 110.

Figure 11:
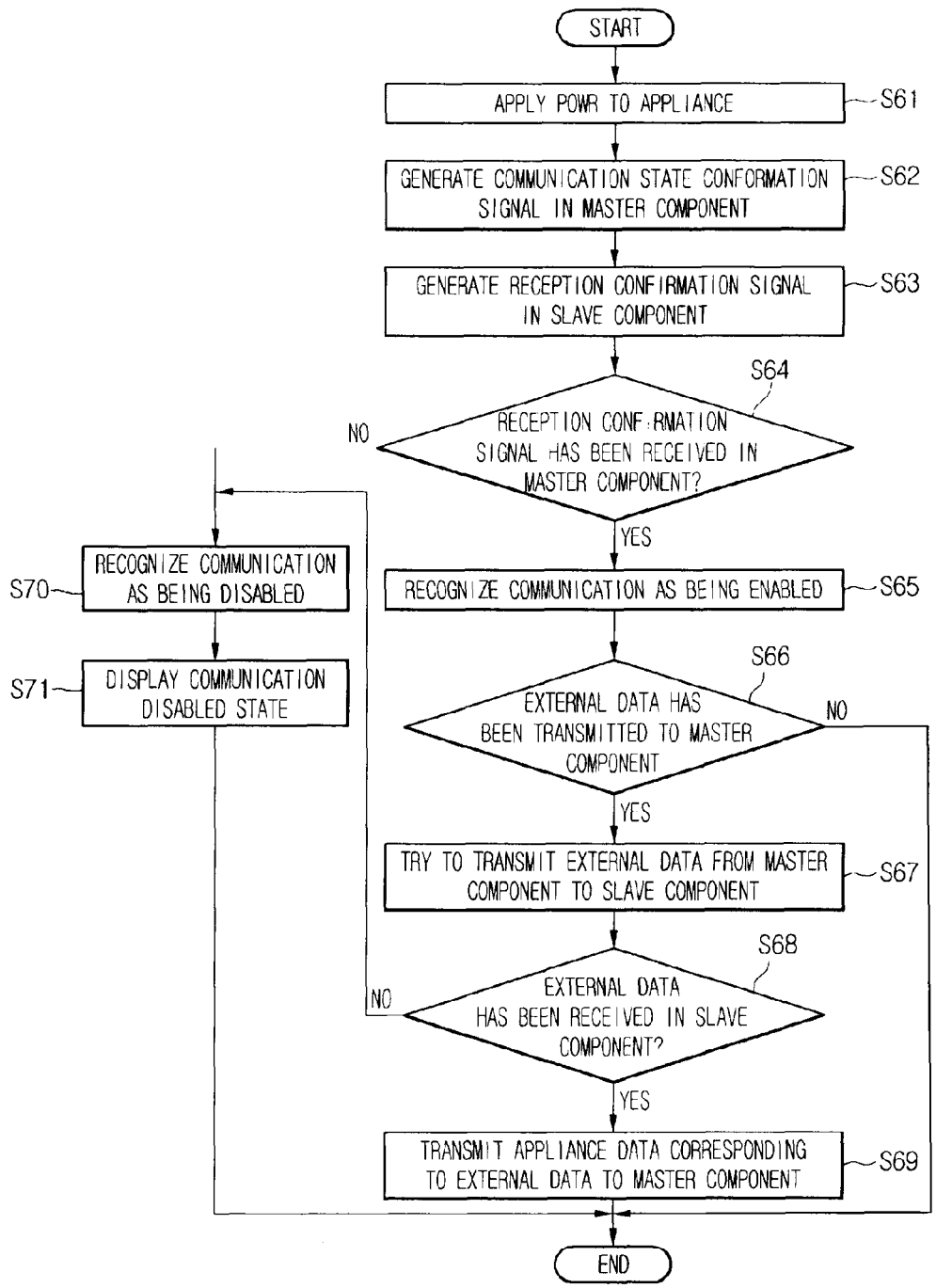
FIG. 11 is a flowchart illustrating a process of communicating signals inside an electric appliance according to the fourth embodiment.

FIG. 11 is a flowchart illustrating a process of communicating signals inside an electric appliance according to the fourth embodiment. Referring to FIG. 11, a control method in the case where according to the fourth embodiment, the first communication unit 110 is a master component and the first appliance control unit 150 is a slave component will be described.

When the electric appliance 100 is powered on (S61), the master component 110 generates the communication state confirmation signal and then delivers the generated communication state confirmation signal to the slave component 150 (S62). The slave component 150 generates the reception confirmation signal corresponding to the communication state confirmation signal (S63).

Whether the master component 150 has received the external data is recognized (S68), and the external data has been received, appliance data responding to the external data is transmitted to the mater component 110 (S69).

However, if the master component 150 has not received the external data, communication may be recognized as being disabled and the electric appliance 100 may display the communication disabled state.

Whether the master component 150 the external data has received the external data is recognized (S68), and the external data has been received, appliance data responding to the external data is transmitted to the master component 110 (S69). However, if the master component 150 has not received the external data, communication may be recognized as being disabled and the electric appliance 100 may display the communication disabled state.

Whether the master component 150 the external data has received the external data is recognized (S68), and the external data has been received, appliance data responding to the external data is transmitted to the mater component 110 (S69). However, if the master component 150 has not received the external data, communication may be recognized as being disabled and the electric appliance 100 may display the communication disabled state.

Another embodiment will now be described.

In FIG. 11, when the external data has been transmitted to the master component 110, the master component 110 tries to transmit the external data to the slave component 150 directly. Unlike this, if the external data has been transmitted to the master component 110, the master component 110 tries to transmit the communication state confirmation signal to the slave component 150 first. When the slave component 150 has responded to the reception confirmation signal, the external data may be transmitted to the slave component 150.

Figure 12:
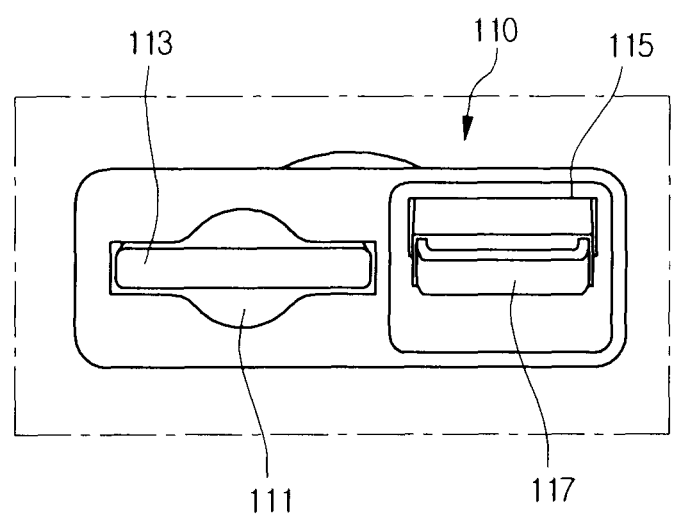
FIG. 12 is a view illustrating a combination structure of a first communication unit according to a fifth embodiment.
Figure 13:
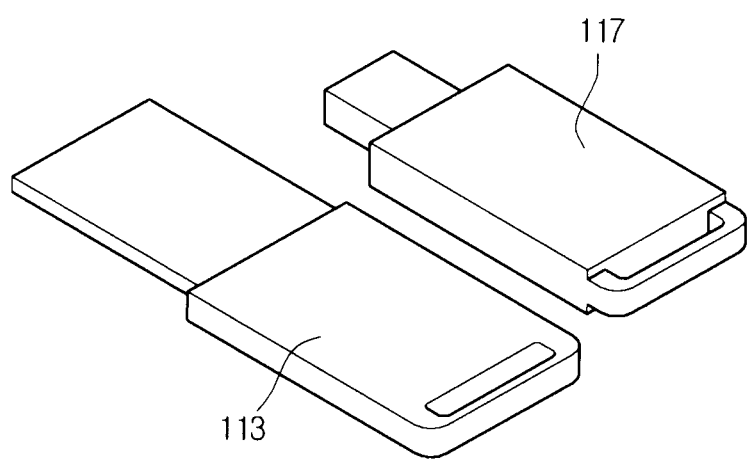
FIG. 13 is a view illustrating a communication module according to the fifth embodiment.

FIG. 12 is a view illustrating a combination structure of a first communication unit according to a fifth embodiment. FIG. 13 is a view illustrating a communication module according to the fifth embodiment.

Referring to FIGS. 12 and 13, the first communication unit 110 according to the fifth embodiment includes a plurality of communication ports 111 and 115 having a plurality of communication modules 113 and 115 which are coupled separably. The plurality of communication modules 113 and 115 include the first communication module 113 and the second communication module 117. The plurality of communication ports 111 and 115 include the first communication port 111 and the second communication port 115 which are removably coupled to the first communication module 113 and the second communication module 117, respectively.

As an example, the first communication module 113 may be a ZIGBEE Modem, and the second communication module 117 may be a Wi-Fi modem (or USB).

The first communication module 113 may receive external power information and transmit power information of the electric appliance 100. The external power information may include the charge, amount, or quality of supplied energy. The power information of the electric appliance 100 may include the charge or amount of energy consumed in the electric appliance.

The second communication module 117 can be understood as a component configuring the network system 10, for example gateway for communicating with a server or control device. If the second communication module 117 is a USB, the USB may be easily used in a case where the communication is limited between the electric appliance 100 and the external component. The USB may download software from a specific server (as an example, web server). The USE may be coupled to the electric appliance 100 to install the software in the electric appliance 100. The USE advantageously enhances communication speed.

As an example, the first communication module 113 may be a Wi-Fi modem, and the second communication module 117 may be a USB. Herein, the first communication module 113 may communicate with at least one of components configuring the network 10. The second communication module 117 may be coupled to the first communication unit 110 removably to download and install software.

Figure 14:
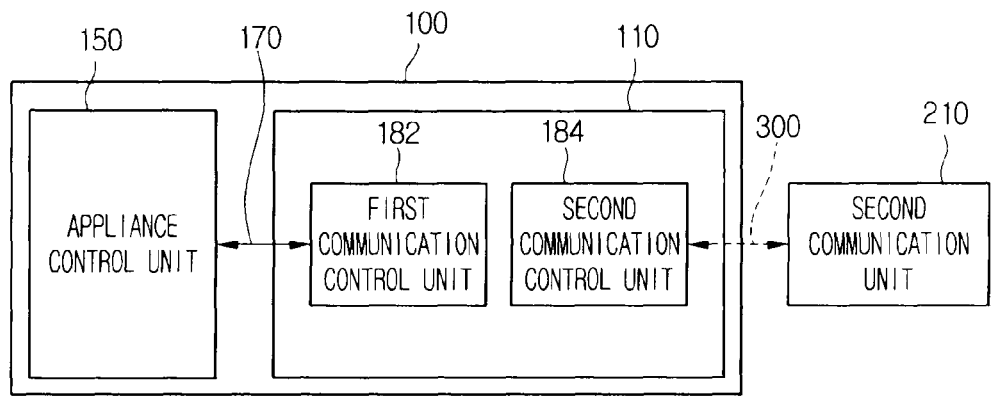
FIG. 14 is a block diagram illustrating a configuration of a first communication unit according to a sixth embodiment.

FIG. 14 is a block diagram illustrating a configuration of a first communication unit according to a sixth embodiment.

Referring to FIG. 14, the electric appliance 100 according to the sixth embodiment includes the first communication unit 110 including a plurality of communication control units 182 and 184 and the appliance control unit 150 communicatively connected to the first communication unit 110.

The plurality of communication control units 182 and 184 include a first communication unit 182 communicatively connected to the appliance control unit 750 and a second communication unit 184 communicatively connected to the external component (as an example, the second communication unit 210). The first and second communication control units 182 and 184 have a built-in host CPU.

In summary, the first communication control unit 182 can be understood as a communication control unit defined in the second interface 170, and the second communication control unit 184 can be understood as a communication control unit defined in the first interface 300. The first communication unit 110 having the plurality of communication control unit 182 and 184 may be referred to as a modem of dual core type.

According to this structure, one communication unit 110 may include a plurality of cores (namely, communication control units) and control difference interfaces, thereby enhancing communication speed and communication reliability.

According to the embodiments, the communication connection process or user interface for controlling an electric appliance can be simply implemented, thereby enhancing user accessibility and thus being industrial applicable.

According to the embodiments, an electric appliance can be remotely controlled with the control device, thereby improving user friendliness.

The communication connection process or user interface for controlling an electric appliance may be simply implemented, thereby enhancing user accessibility.

Various communication methods for connecting communication between an electric appliance and a control device can be provided, thereby selecting a specific communication method to control the electric appliance conveniently.

Also, the interface between an electric appliance and the control device may be simply implemented, thereby enhancing reliability of communication the electrical appliance and the control device.

Also, the interface between the communication unit and the control unit included inside an electric appliance may be simply implemented, thereby enhancing reliability of communication between the electrical appliance and the control device and reliability of the electric appliance itself.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A network system comprising:
   a first component, when powered on, recognizing a first device code, being assigned a communication address of a second component, and performing a predetermined function; and
   the second component, when powered on, recognizing a second device code, being assigned a communication address of the first component, and exchanging information with the first component for communication connection,
   wherein if one of the first and second components receives a command for the communication connection, the one of the first and second components generates a connection sequence,
   the one of the first and second components exchanges communication addresses and device codes with the other one of the first and second components, and
   if the information is not exchanged between the first component and the second component during a predetermined time, at least one of the first component and the second component are switched to a communication connection standby mode, and
   wherein if a command for operating the first component is input through the first or second component, information is communicated between the first and second components, the information being communicated between the first and second components comprising:
   an auto signal automatically transmitted from one of the first and second components to the other of the first and second components after communication connection is established between the first and second components, the auto signal comprising power information having first time information; and
   a synchronization signal in which the other of the first and second components transmits to the one of the first and second components to respond to the auto signal, the synchronization signal comprising a time synchronization signal for synchronizing second time information of the other component with the first time information.

2. The network system according to claim 1, wherein the first component comprises an electric appliance and the second component comprises a control device for controlling operations of the electric appliance.

3. The network system according to claim 1, wherein the first component comprises a control device for controlling an electric appliance, and the second component is a server storing operation information of the electric appliance.

4. The network system according to claim 1, wherein the information communicated between the first and second components further comprises:
   data transmitted from one of the first and second components; and
   a corresponding signal transmitted from the other of the first and second components and corresponding to the data.

5. The network system according to claim 4, wherein the corresponding signal comprises at least one of:
   a confirmation signal for confirming reception of the data; and
   a resulting signal comprising a result of information requested through the data.

6. The network system according to claim 5, wherein the resulting signal comprises at least one of current or past operation information and a state value initially stored in the other component.

7. The network system according to claim 1, wherein if a data change occurs at one of the first and second components when the first and second components are in the communication connection standby mode, communication is reconnected between the first and second components.

8. A network system comprising:
   an electric appliance, when powered on, recognizing a first device code, being assigned a communication address of an external component, and performing a predetermined function; and
   the external component, when powered on, recognizing a second device code, being assigned a communication address of the electric appliance, and exchanging information with the electric appliance for communication connection,
   wherein the electric appliance or external component receives a command for the communication connection to generate a connection sequence, and
   one of the electric appliance and external component generating the connection sequence exchanges communication addresses and device codes with the other one of the electric appliance and external component receiving the connection sequence,
   wherein the electric appliance comprises:

a master component generating a communication state confirmation signal for confirming whether an interface of the electric appliance is in a communication enabled state; and a slave component transmitting at least a reception confirmation signal corresponding to the communication state confirmation signal of the master component, wherein one of the master and slave components is a communication unit to communicate with the external component and the other of the master and slave components is an appliance controller to control the appliance, the communication unit and the appliance controller being installed in the electric appliance, wherein the communication unit comprises a first communication control unit communicatively connected to the appliance controller and a second communication control unit communicatively connected to the external component, and wherein the first and second communication control units have a built-in host CPU, respectively, wherein if a command for operating the electric appliance is input through the electric appliance or the external component, information is communicated between the electric appliance and the external component, the information being communicated between the electric appliance and the external component comprising:

an auto signal automatically transmitted from one of the electric appliance and the external component to the other of the electric appliance and the external component after communication connection is established between the electric appliance and the external component, the auto signal comprising power information having first time information; and a synchronization signal in which the other of the electric appliance and the external component transmits to the one of the electric appliance and the external component to respond to the auto signal, the synchronization signal comprising a time synchronization signal for synchronizing second time information of the other of the electric appliance and the external component with the first time information.

9. The network system according to claim 8, wherein the slave component transmits external data delivered from the external component or internal data of the electric appliance to the master component as a signal corresponding to the communication state confirmation signal.

10. The network system according to claim 8, wherein the communication state confirmation signal is generated periodically or when external data is received from the external component.

11. The network system according to claim 8, wherein if the master component has not received the reception confirmation signal from the slave component or data of the external component, the master component is recognized as in a communication disabled state.

12. The network system according to claim 8, wherein if the slave component does not receive the data of the external component from the master component, the slave component is recognized as in a communication disabled state.

13. The network system according to claim 8, wherein the electric appliance comprises a plurality of communication ports at which a plurality of communication modules are removably disposed, and the plurality of communication modules comprise a ZIGBEE modem and at least one of a Wi-Fi modem and a USB.

* * * * *